United States Patent [19]

Bigo

[11] Patent Number: 5,848,205
[45] Date of Patent: Dec. 8, 1998

[54] POLARIZATION INDEPENDENT NON-LINEAR OPTICAL MIRROR

[75] Inventor: Sébastien Bigo, Palaiseau, France

[73] Assignee: Alcatel N.V., Rijswijk, Netherlands

[21] Appl. No.: 790,933

[22] Filed: Jan. 29, 1997

[30] Foreign Application Priority Data

Jan. 30, 1996 [FR] France .................................... 96 01083

[51] Int. Cl.$^6$ .............................. G02B 6/26; H04J 14/00
[52] U.S. Cl. ................................ 385/15; 385/11; 385/24; 385/1; 385/122; 385/42; 359/115; 359/122
[58] Field of Search .................................. 385/11, 13, 16, 385/24, 27, 28, 41, 42, 123, 122, 1, 3; 359/115, 116, 124, 127, 122, 119, 117

[56] References Cited

U.S. PATENT DOCUMENTS

| 5,357,359 | 10/1994 | Uchiyama et al. | 359/123 |
| 5,592,319 | 1/1997 | Lee et al. | 359/127 |
| 5,646,759 | 7/1997 | Lichtman et al. | 359/138 |
| 5,687,260 | 11/1997 | Liedenbaum | 385/16 |

OTHER PUBLICATIONS

D. Sandel et al, "Polarization–independent regenerator with nonlinear optoelectronic phase–locked loop", *OFC '94, optical fiber communications,* vol. 4 1994, Technical Digest Series, Conference Edition (IEEE Cat. #94CH3422–3) 1994–Conference on Optical Fiber Communication, Feb. 20–25, 1994, Optical Society America, pp. 310–311.

D. Mahgerefteh et al, "Bandwidth and bit error rate performance of walk–off compensating 1.5/1.3 mu m wavelength converter", *Electronics Letters,* 3 Aug. 1995, UK, vol. 13, #16, ISSN 0013–5194, pp. 1380–1381.

N. A. Whitaker, "Polarization–Independent All–Optical Switching", *IEEE Photonics Technology Letters,* vol. 4, No. 3, 1 Mar. 1992, pp. 260–263.

*Primary Examiner*—Brian Healy
*Attorney, Agent, or Firm*—Sughrue, Mion, Zinn, Macpeak & Seas, PLLC

[57] ABSTRACT

The invention relates to a non-linear optical mirror comprising an optical fiber loop that operates independently of the polarizations of the signals of respective wavelengths $\lambda_s$ and $\lambda_c$ present on its signal and control inputs. The loop of the NOLM is made up of four polarization-maintaining fiber segments having equivalent optical lengths. These four segments are optically optically interconnected by three splices at three locations. At the first and third splices, the neutral propagation axes of the polarization-maintaining fibers are turned through 90°. According to the invention, a mode converter is inserted in the loop at the second splice, the converter comprising an optical demultiplexer and an optical multiplexer together with two polarization-maintaining optical paths inter-connecting them. The demultiplexer separates the two optical signals present at its input and applies them respectively to said two paths. On the path conveying the control signal, $\lambda_c$, there is a splice including 90° rotation of the polarization-maintaining neutral axes. On the other path, there is no rotation of the axes. The multiplexer then recombines the two signals. The invention is applicable to long distance telecommunications by optical fiber.

8 Claims, 3 Drawing Sheets

POLARIZATION INDEPENDENT NON-LINEAR OPTICAL MIRROR

The present invention relates to the field of processing optical signals, e.g. signals travelling within an optical telecommunications system. More precisely, the invention relates to a non-linear optical loop mirror device (NOLM) which can be used for routing, switching, or modulating optical signals.

BACKGROUND OF THE INVENTION

The person skilled in the art knows numerous embodiments and applications of NOLMs in photon circuits such as telecommunications links via optical fibers.

A conventional NOLM is shown in FIG. 1. In general, a NOLM comprises an optical fiber loop L; a first optical coupler C1 having four ports 1, 2, 3, and 4, said coupler C having a coupling coefficient $\xi/(1-\xi)$ which describes the way in which optical power is shared between the various ports; and a second optical coupler C2 for injecting a control first signal into the NOLM via a first control optical fiber F3.

Optionally adding an optical amplifier GL to the loop can confer positive overall gain, thus constituting a non-linear amplifying loop mirror (NALM); or else such an amplifier can merely compensate the insertion losses to confer unity overall gain.

The optical signal to be switched by the NALM is injected via input fiber F1 to port 1 of the coupler C1. We begin by describing the case when the coupling coefficient $\xi/(1-\xi)$ of the coupler C1 is 50/50, and in the absence of a control signal on the fiber F3. In this case, 50% of the power of said optical signal appears on port 4, while the other 50% appears on port 3 of the coupler C1, but with a $\pi/2$ radian (90°) relative phase shift between them. The two signals thus propagate in opposite directions round the fiber loop which has a length of the order of 5 km to 10 km. Since the optical paths of the two signals are identical, the signals reach the ports 3 and 4 respectively of the coupler C1 where they interfere. The coupler C1 gives rise to another relative phase shift of $\pm\pi/2$.

Since the two signals are now phase shifted by $\pm\pi$ or 0, destructive interference takes place (phase shift of $\pm\pi$) for the resultant wave going towards port 2 of the coupler C1, so no signal is transmitted to the output fiber F2. In contrast, the interference is constructive (phase shift 0) for the resultant wave directed towards the port 1 of the coupler C1, so in this case the signal applied to the port 1 is totally reflected by the NALM back to port 1.

We now consider the case where a control signal is present on the control optical fiber F3. This signal is coupled into the loop of the NALM by the optical coupler C2 and it propagates round the loop in a clockwise direction. The waves of the signal travelling around the loop in the opposite direction are affected little, if at all, by the presence of a control signal. In contrast, the waves of the signal propagating in the same direction round the loop are disturbed. The loop fiber L presents a non-linear effect that changes the refractive index of the fiber as a function of optical power, or more exactly as a function of the amplitude of the electric field in the fiber (the Kerr effect). The electric fields of the waves travelling together, said to be "co-propagating", superpose in linear manner and therefore the resulting intensity of the electric field is greater than that for waves propagating in the other direction round the loop L.

The effective refractive index of the loop L as seen by the co-propagating waves is different from that as seen by the counter-progagating waves. Their propagation speeds are therefore different. Their arrival times at the coupler C1 are different, so these waves interfere little, if at all. All or nearly all of the optical power is to be found on port 2 of coupler C1, carried by the output fiber F2.

Thus, the presence of a control signal on the control fiber F3 is capable of controlling switching of the non-linear optical mirror, which remains transparent in the presence of the control signal and which becomes reflective in the absence of a control signal. Switching can be very fast, of the order of at least 100 GHz. Inserting a birefringent element in the NOLM loop can invert the switching characteristics, so as to make the mirror transparent in the absence of a control signal and reflective in the presence of a control signal.

The NOLM as described above forms part of the prior art, and it can be used, for example, in a circuit for regenerating solitons by switching a clock signal by means of a NOLM, as described in document D1=J. K. Lucek and K. Smith (1993), "All-optical signal regenerator", Opt. Lett., Vol. 18, No. 15, pp. 1226–1228, Aug. 1, 1993, which is expressly incorporated in the present application as a description of the prior art.

Other documents are useful for a better understanding of the present invention, and are briefly presented with a summary of their contributions to this end. Those documents are also expressly incorporated in the present application as descriptions of the prior art:

D2=N. Finlayson et al. (1992), "Switch inversion and polarization sensitivity of the non-linear optical loop mirror (NOLM)", Optics Lett., Vol. 17, No. 2, pp. 112–114, Jan. 15, 1992. That document teaches that the NOLM can be organized as a switch that is little, if at all, sensitive to the polarization of the light signal to be switched under linear conditions, and that the birefringence of the loop can contribute to the instabilities observed in mode locking ring lasers.

Various NOLM configurations are described in the literature which make the NOLM independent of polarization in one or other of the light signals travelling around the NOLM. Those documents are also expressly incorporated in the present application as descriptions of the prior art.

D3=K. Uchiyama et al. (1992), "Ultrafast polarization-independent all-optical switching using a polarization diversity scheme in the non-linear optical loop mirror (NOLM)", Electron. Lett., Vol. 28, No. 20, pp. 1864–1866, Sept. 24, 1992. That document shows the use of a NOLM as a switch, which is made insensitive to the polarization of the light in the signal to be switched. This is achieved by using a polarization-maintaining fiber that is cut and turned through 90° at the midpoint of the NOLM loop. The principle is shown in FIG. 2.

The NOLM loop is constituted, for example, by a two-hole PANDA polarization-maintaining fiber. By imparting 90° rotation between the axis A1 and the axis A2 at the propagation halfway point, the fast axis of the lefthand portion becomes the slow axis of the righthand portion of the loop in FIG. 2, and vice versa. The fiber of the loop (L) is polarization dispersive, i.e. the propagation speed of light within the fiber is different for polarization in alignment with the fast axis compared with polarization that is orthogonal to the fast propagation axis, i.e. aligned with the slow axis of the fiber. It is necessary to overcome polarization dispersion which is done by using two equivalent lengths of fiber having a mutually orthogonal disposition of polarization-maintaining axes A1 and A2, thereby causing polarization dispersion to cancel out over the length of the loop L.

To make the system independent of the polarization of the switched signal, the polarization of the control signal injected into the loop L by the coupler C2 on the control fiber F3 takes place at 45° to the two orthogonal axes A1 and A2. As before, the polarization dispersion effects cancel out.

D4=Uchiyama et al. (1995), "Polarization independent wavelength conversion using non-linear optical loop mirror", Elect. Lett. 31 (21), p. 1862, Oct. 12, 1995 describes a system for converting the wavelength of an optical signal of undetermined polarization, applied to the control input of a NOLM as described above with reference to FIG. 1. To make the performance of that apparatus independent of the polarization of the optical signal whose wavelength is to be converted, the NOLM is made of polarization-maintaining fiber as in D3, and the clock signal is injected to the input of the coupler C1 with its polarization at 45° to the neutral axes of the NOLM loop.

The document considered by the Applicants as being the closest prior art document is D4=D. Sandel et al. (1994), "Polarization-independent regenerator with non-linear opto-electronic phase-locked loop", Optical Fiber Conference Proceedings 1994, Paper FG2. That document describes the use of a NOLM having a 3×3 coupler at its main input. In an embodiment of the invention, such a 3×3 coupler is used to obtain a certain phase relationship, as taught in that document. The use of a 3×3 coupler instead of a 2×2 coupler gives rise to non-symmetrical phase shifting in the loop of the NOLM. The consequent degradation of the extinction ratio of the mean pumping power (or the extent to which the loop is filled by clock signals) as seen by the counter-propagating signals can be eliminated by this phase shift, providing various other parameters are suitably selected.

The NOLM of D5 has four polarization-maintaining fiber segments (T1, T2, T3, T4) all of equivalent optical length. The four segments (T1, T2, T3, T4) are optically interconnected by three splices (E1, E2, E3) at three locations. At the first and third splices, the polarization-maintaining axes of the fiber are turned through 90°. At the second splice, a mode converter is inserted in the loop, which converter comprises a polarization dispersive optical fiber whose length is selected as a function of the signal wavelength and of the control wavelength (which wavelengths are respectively $\lambda_s$ and $\lambda_c$).

It comprises a short length of polarization-maintaining fiber whose axes are at 45° to the neutral axes of the adjacent segments (T2, T3). The length of said fiber is selected to present an optical path length such that there exists an integer number n of beat lengths for the signal (of wavelength $\lambda_s$) and n±½ beat lengths for the pumping light (in this case equivalent to the control light at wavelength $\lambda_c$).

The embodiment of that document D5 includes drawbacks which the invention seeks to mitigate. That apparatus suffers from severe problems of practical implementation. The characteristics of the fiber used as a mode converter must be known very precisely, and its length must be adjusted with tolerance that is much shorter than one beat length (a few millimeters in a highly birefringent fiber). The mode converter must be temperature regulated. Also, it is clear that mode conversion can be achieved only for a well determined pair of wavelengths ($\lambda_s, \lambda_c$). Further, polarization dispersion is not compensated and mode conversion on its own, as theoretically presented in document D5, is insufficient for obtaining independence from control polarization.

D6=U.S. Pat. No. 5,377,284 in the name of H. Bülow describes a SAGNAC interferometer for fast switching an optical signal in response to the application of a control optical signal. The interferometer described acts in the same manner as the above-described NOLM, and its operation relies on the same physical principles. Bülow describes one way of making the operation of the switch independent of the polarization of the optical signal to be switched, by making the control signal substantially de-polarized.

According to Bülow, the pulse of the control optical signal may contain a plurality of polarization states distributed within the pulse. Another proposed solution is the use of two light beams in the control pulse, these two beams having linear polarization and polarization axes that are mutually orthogonal.

D7=N. A. Whitaker et al. (1992), "Polarization-independent all-optical switching", IEEE Photon. Tech. Lett., 4 (3), pp. 260–263, Mar. 3, 1992. In that article, the author proposes a NOLM that is made independent of the polarization of the control signal by using the polarization dispersion of the fiber of the NOLM. After passing through a PDM→TDM apparatus, the signal and the control propagate on respective ones of the polarization axes (i.e. the polarization of the signal is imposed!) and they intersect N times to increase the non-linear effect (N polarization-maintaining fiber segments whose axes are turned through 90° at each splice).

OBJECTS AND SUMMARY OF THE INVENTION

An object of the invention is to mitigate the problems and the drawbacks of the prior art.

To this end, the invention provides a non-linear optical loop mirror (NOLM), said NOLM comprising an optical fiber loop (L), said loop (L) having a signal output and a signal input for injecting a first optical signal characterized in part by a first wavelength ($\lambda_s$), and a first signal input/output optical coupler (C1) with a coupling coefficient of $\xi/(1-\xi)$ for coupling said input and said output to said loop (L), said NOLM also having a first control input via a control fiber (F3) and a second optical coupler (C2) for coupling said first control input to said loop (L) to enable a "control" second optical signal characterized in part by a second wavelength ($\lambda_c$) to be injected into said loop (L) via the control fiber (F3), said optical fiber loop (L) having an even number, 2i>2, i integer, of segments (T1, T2, T3, T4, ... ) of polarization-maintaining fiber having two neutral propagation axes (A1, A2), said segments having equivalent optical lengths and being optically interconnected via 2i−1 splices (E1, E2, E3, ... ) at 2i−1 locations, said neutral propagation axes of the fiber being turned through 90° at the 2i−2 splices (E1, E3) other than the splice in the middle of the loop, with the i-th splice (E2) including a mode converter, wherein said mode converter comprises an optical polarization-maintaining demultiplexer (C3) and an optical polarization-maintaining multiplexer (C4) together with first and second optical paths (F$\lambda_s$, F$\lambda_c$) interconnecting them for conveying said first and second wavelengths ($\lambda_s, \lambda_c$) respectively, said optical paths (F$\lambda_s$ and F$\lambda_c$) being implemented by polarization-maintaining fiber, and wherein the neutral axes (A1, A2) of said second path (F$\lambda_c$) are turned through 90° while the neutral axes of said first path (F$\lambda_s$) are not turned.

In a particular embodiment, said optical demultiplexer and multiplexer (C3, C4) are polarization-maintaining optical couplers that are wavelength-selective to separate and combine said first and second optical signals having said first and second wavelengths ($\lambda_s, \lambda_c$).

In a variant, there are four segments and three splices.

In a preferred embodiment, the lengths (L1, L2, L3, L4) of said four polarization-maintaining fiber segments (T1, T2, T3, T4) are selected so that the non-linear phase shift induced by control on one of the neutral axes and integrated over the i first segments (the first half of the loop T1, T2), is equal to the non-linear phase shift induced by the control on the other axis and integrated over the i last segments (in the second half of the loop, T3, T4).

The NOLM of the invention can advantageously be organized for applications that are known but for which performance has until now been compromised by the sensitivity of prior art NOLM apparatuses to polarization. Thus, the invention also provides:

an optical wavelength converter including a NOLM of the invention;

an optical switch including a NOLM of the invention;

an optical modulator for a loop fiber laser including a NOLM of the invention; and an optical soliton regenerator providing time jitter correction, and including a NOLM of the invention.

BRIEF DESCRIPTION OF THE DRAWINGS

The invention will be better understood together with its various characteristics and advantages in the light of the following detailed description and the accompanying drawings, in which.

The drawings are given as non-limiting examples for the purpose of illustrating the principles of the invention. In all of the figures, the same references relate to the same elements, and the drawings are not always to scale, for reasons of clarity.

MORE DETAILED DESCRIPTION

Figure 2:
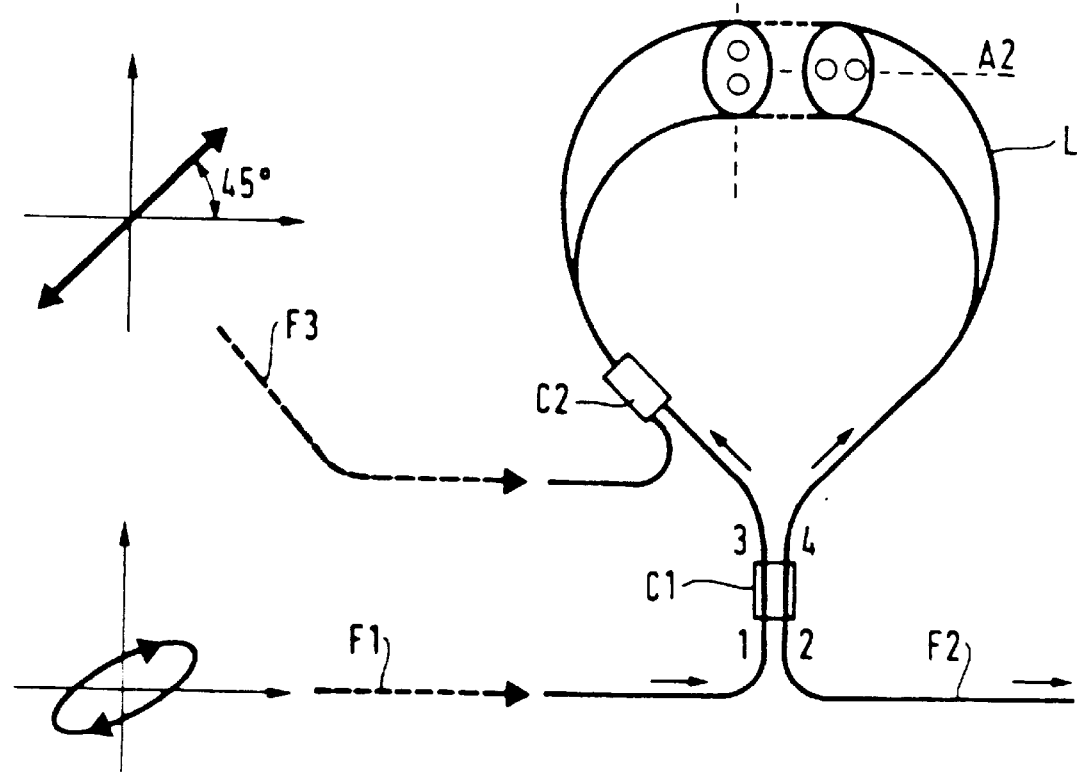
FIG. 2, described above, is a diagram showing a NOLM switch that is insensitive to the polarization of the signal to be switched, as known in the prior art from document D3.
Figure 3:
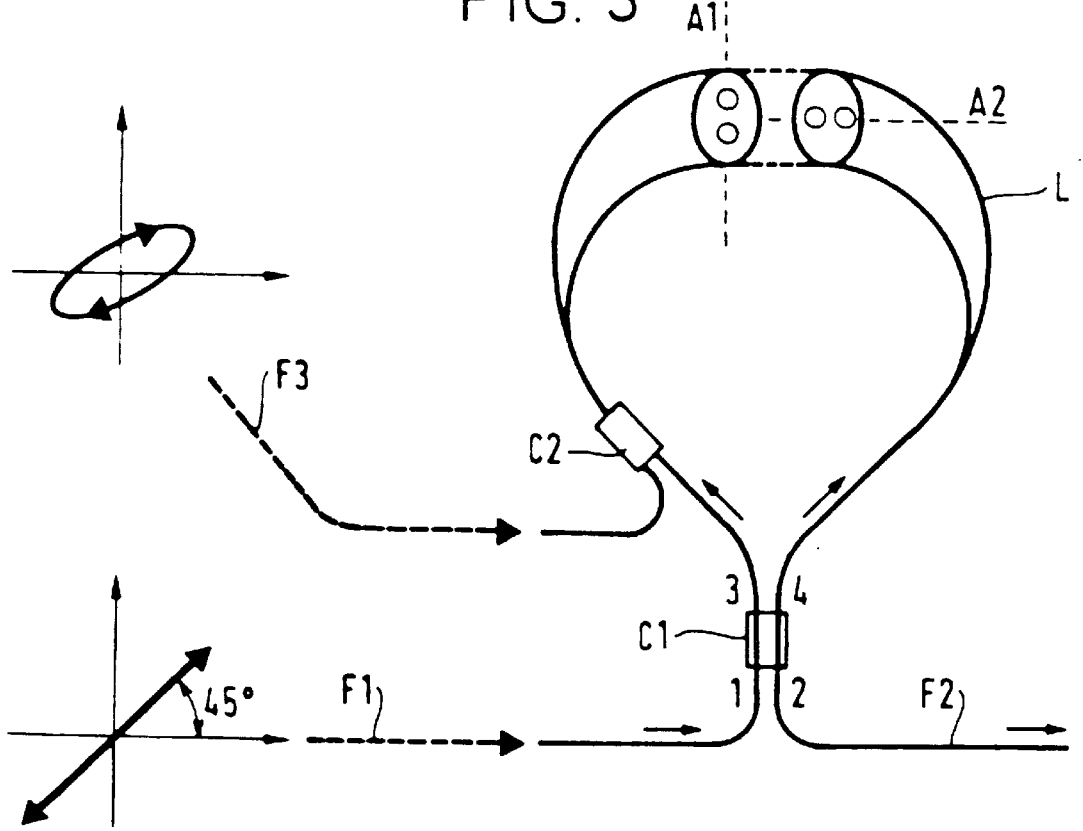
FIG. 3 is a diagram showing a NOLM wavelength converter that is insensitive to the polarization of the control signal, as known in the prior art from document D4.

FIG. 3 is a diagram showing an example of a non-linear optical loop mirror (NOLM) suitable for use as a wavelength converter, as described in document D3. The mechanical structure of the FIG. 3 apparatus is identical to that described above with reference to FIG. 2. Only the polarizations of the signals injected into the loop L are inverted relative to those of FIG. 2. The FIG. 3 NOLM is insensitive to the polarization of the pump light signal ($\lambda_c$) injected into the loop via the optical coupler C2 providing that the light of the clock signal ($\lambda_s$) is polarized in a direction that is at 45° relative to the neutral propagation axes of the polarization-maintaining fibers of the loop L.

The NOLMs described above form part of the prior art, and they cannot simultaneously be insensitive to the polarizations of both optical signals injected via the optical couplers (C1, C2) of the NOLM and compensate polarization dispersion over the loop.

An object of the invention is to mitigate those drawbacks of the prior art, and in particular to enable the NOLM to be insensitive to the polarizations of the two optical signals injected via the two optical couplers (C1, C2) of the NOLM, and to compensate polarization dispersion over the loop. Another object of the invention is to provide a NOLM whose qualities can be obtained simultaneously with components that are easier to implement industrially than those taught in the prior art, and that are also relatively insensitive to variations in ambient temperature.

Figure 1:
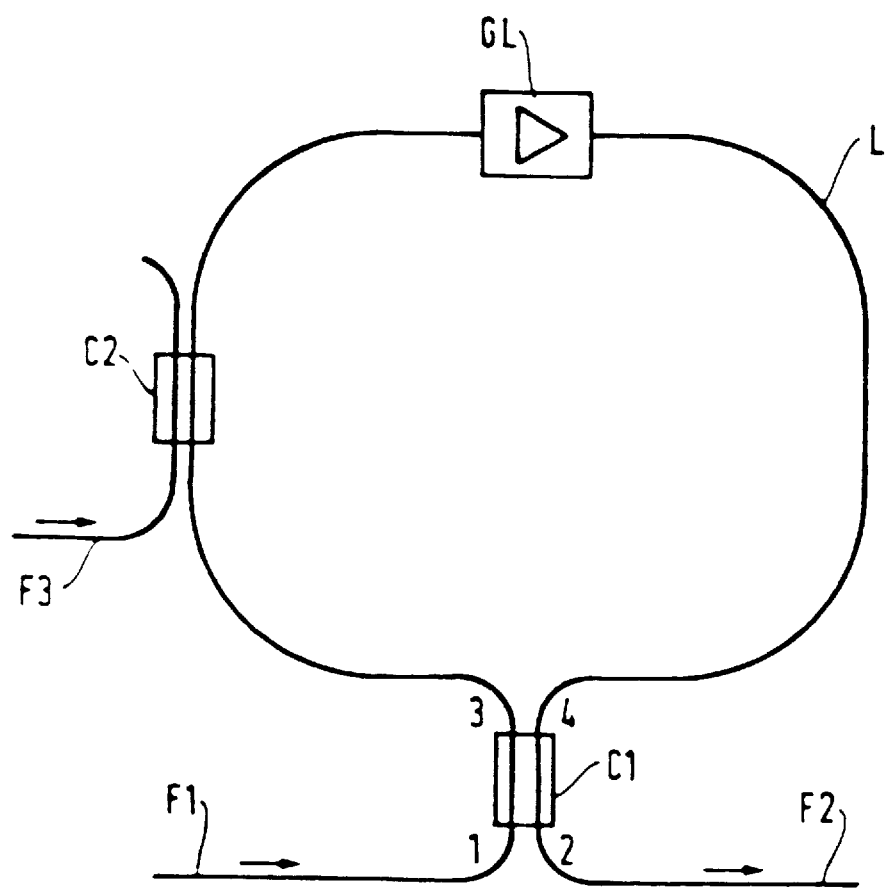
FIG. 1, described above, is a diagram showing an example of a non-linear optical loop mirror (NOLM) known in the prior art.
Figure 4:
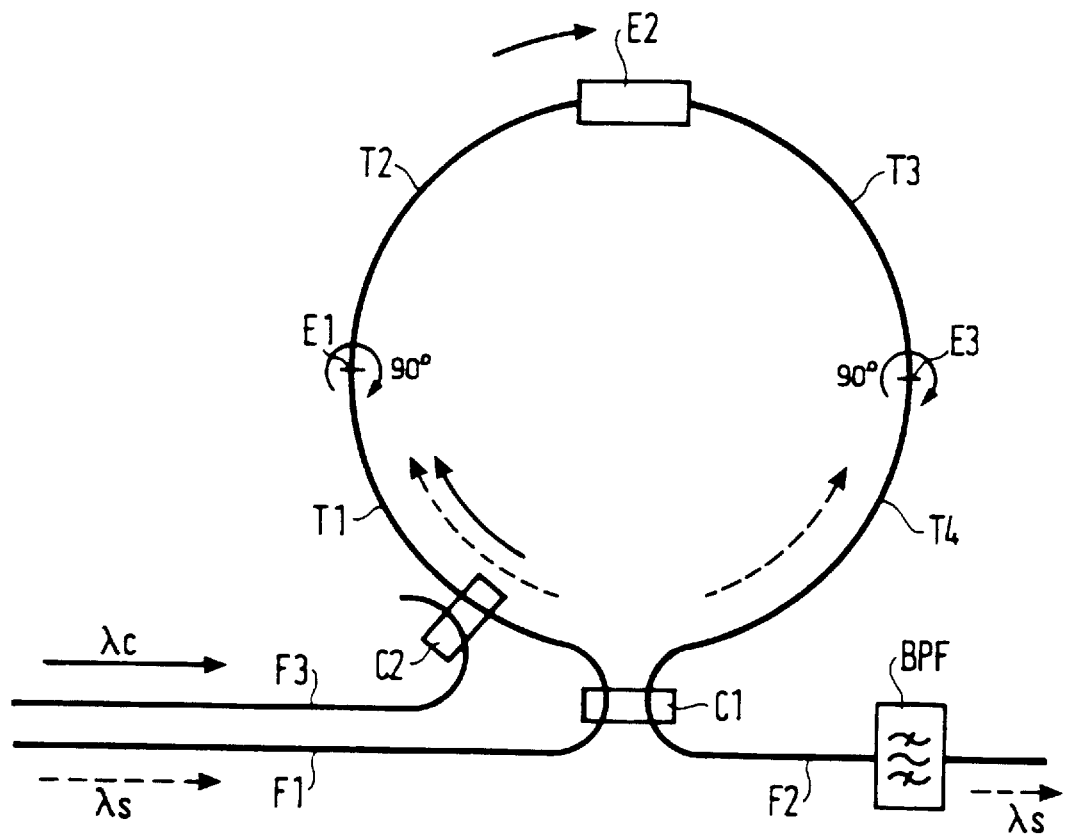
FIG. 4 is a diagram showing an embodiment of the invention comprising a NOLM that is insensitive to the polarization of the signals present on its signal input and on its control input.

The operation of the NOLM of the invention, an example of which is shown diagrammatically in FIG. 4, is identical to that of the NOLMs described above with reference to FIGS. 1, 2, and 3. Like the NOLMs of FIGS. 2 and 3, the NOLM of the invention is made up of a plurality of polarization-maintaining fiber segments. According to the invention, the number of segments is an even number 2i, where i is an integer greater than 1. As shown in FIG. 4, it is necessary to have a minimum of four segments (T1, T2, T3, T4) that are of equivalent optical lengths (respectively L1, L2, L3, and L4). These four segments (T1, T2, T3, T4) are optically interconnected by three splices (E1, E2, E3) at three locations. At the first and third splices (E1, E3), the neutral propagation axes of the polarization-maintaining fiber are turned through 90° as explained above with reference to the single splice of FIG. 2.

Figure 5:
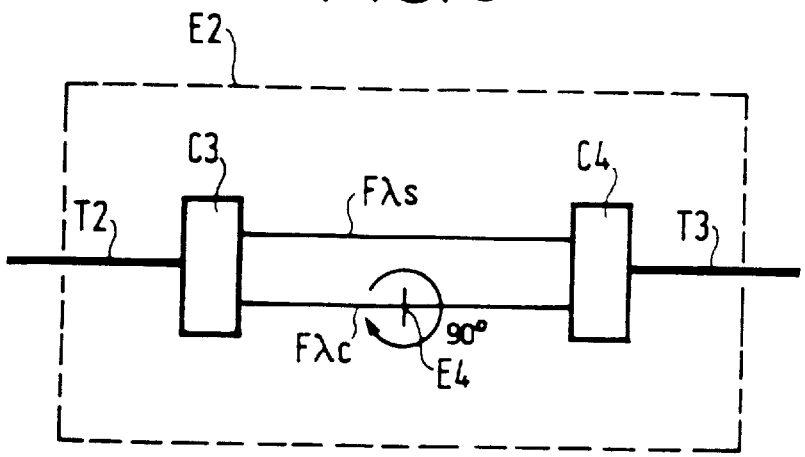
FIG. 5 is a diagram showing an example of a mode converter suitable for use in the FIG. 4 embodiment.

According to the invention, a mode converter as shown in FIG. 5 is inserted in the loop L at the second splice E2 between the segments T2 and T3, which converter comprises an optical demultiplexer C3, an optical multiplexer C4, and two polarization-maintaining optical paths $F\lambda_s$ and $F\lambda_c$ interconnecting them. The demultiplexer C3 separates the two optical signals ($\lambda_s$, $\lambda_c$) present on its input and applies them respectively to said two paths ($F\lambda_s$, $F\lambda_c$). On the path $F\lambda_c$ conveying the control signal $\lambda_c$, a splice E4 is made that includes 90° rotation of the neutral propagation axes of the polarization-maintaining fiber. On the other path, $F\lambda_s$, the axes are not rotated. Thereafter, the multiplexer C4 recombines the two signals, $\lambda_s$ and $\lambda_c$.

The demultiplexer C3 and the multiplexer C4 can be implemented, for example, using three polarization-maintaining fibers, with a dichroic fiber and a polarization-maintaining optical coupler. Such a component is commercially available from the Canadian company JDS FITEL Inc., Nepean, Ontario, under catalog No. WD1555-ALL5JM1, for example. It is also possible that such a component can be made in the near future using integrated optical technology.

There is no longer any need to arrange for the control optical signal $\lambda_c$ to be injected into the NOLM via the coupler C2 so that its polarization axis is at 45° relative to the polarization-maintaining axes A1 and A2 in the fiber of the loop L. The operation of the apparatus is thus insensitive to the polarization of two signals $\lambda_s$ and $\lambda_c$, thus constituting a major advantage compared with the prior art embodiments described in documents D1, D2, D3, and D4.

Compared with the apparatus of document D5, implementation is considerably simplified since the lengths of the two optical paths $F\lambda_s$ and $F\lambda_c$ are no longer critical as is the length of the mode converter of D5. In addition, the mode converter of the invention is relatively insensitive to ambient temperature, whereas the apparatus of D5 requires temperature regulation in order to operate properly. Also, the NOLM of D5 does not compensate the polarization dispersion of the signals propagating over the loop L.

Thus, the NOLM of the invention can operate properly and reproducibly with signals $\lambda_s$ and $\lambda_c$ of polarizations that are arbitrary, unknown, and possibly incapable of being controlled. Also, polarization dispersion is compensated automatically and without adjustment.

To describe more precisely a preferred embodiment of the invention, it is appropriate to describe what is meant in the present context by segments (T1, T2, T3, T4) having optical lengths that are "equivalent". To do this, account must be taken of the optical losses suffered by the optical signals propagating in the segments of the loop L and through the splices interconnecting them, since polarization independence depends on the non-linear phase shifts (Kerr effect) upstream and downstream of the mode converter being equal, and thus on the signal amplitudes being equal.

To give an example of how the lengths of the segments are calculated, various assumptions are made to simplify the description. An even number of segments is selected, 2i=4. Within each pair of segments, the lengths are selected to be identical (L1=L2, L3=L4) so as to compensate polarization dispersion within each pair. As shown in FIG. 4, the optical coupler C2 is located close to the beginning of the first segment T1. A signal injected via the coupler C2 is subjected successively to losses in T1, E1, T2, E2, T3, E3, and T4. This signal is therefore at its weakest in the last segment T4, so the non-linear effects will likewise be at their weakest in said segment. To obtain effects of the same magnitude in the last segment T4 as in the first segment T1, it is therefore necessary for the length L4 of the last segment T4 to be greater than the length L1 of the first segment T1.

It is assumed that fiber attenuation has a constant value in all of the segments, e.g. $\alpha=0.23$ dB/km, and the losses in the splices E1, E2, and E3 are written respectively P1, P2, and P3.

Taking the condition that the non-linear phase shift induced by control on one of the neutral axes and integrated over the first i segments (the first half of the loop, T1, T2) is equal to the non-linear phase shift induced by control on the other axis and integrated over the last i segments (the second half of the loop, T3, T4), the following can be written:

$$(1-e^{-\alpha L1})/\alpha + (P1 \times e^{-\alpha L1}) \times (1-e^{-\alpha L1})/\alpha = P1 \times P2 \times (e^{-2\alpha L1})(1-e^{-\alpha L4})/\alpha + P1 \times P2 \times P3 \times [e^{-\alpha(2L1+L4)}][1-e^{-\alpha L4}]/\alpha$$

This means that L1 and L4 must satisfy the following relationship:

$$1+(P1-1)e^{-\alpha L1}+P1 \times e^{-2\alpha L1}=[P1 \times P2 \times e^{-2\alpha L1}][1+(P3-1)e^{-\alpha L4}+P3 \times e^{-2\alpha L4}]$$

Insertion losses in the mode converter of an optical path without rotation of the polarization axes are negligible compared with the terms retained in the above equations.

The NOLM of the invention may have a larger (even) number of segments, but that increases the complexity of the apparatus, and also the losses due to the splices.

The person skilled in the art will be able to apply the concept so as to adapt it to numerous applications in various embodiments without thereby going beyond the ambit of the present invention, as defined by the following claims.

I claim:

1. A non-linear optical loop mirror (NOLM), said NOLM comprising an optical fiber loop, said loop having a signal output and a signal input for injecting a first optical signal characterized in part by a first wavelength, and a first signal input/output optical coupler with a coupling coefficient of $\xi/(1-\xi)$ for coupling said input and said output to said loop, where $0 \geq \xi \geq 1$, said NOLM also having a first control input via a control fiber and a second optical coupler for coupling said first control input to said loop to enable a "control" second optical signal characterized in part by a second wavelength to be injected into said loop via the control fiber, said optical fiber loop having an even number, $2i > 2$, i integer, of segments of polarization-maintaining fiber having two neutral propagation axes, said segments having equivalent optical lengths and being optically interconnected via $2i-1$ splices at $2i-1$ locations, said neutral propagation axes of the fiber being turned through 90° at the $2i-2$ splices other than the splice in the middle of the loop, with the i-th splice including a mode converter, wherein said mode converter comprises an optical polarization-maintaining demultiplexer and an optical polarization-maintaining multiplexer together with first and second optical paths interconnecting them for conveying said first and second wavelengths respectively, said optical paths being implemented by polarization-maintaining fiber, and wherein the neutral axes of said second path are turned through 90° while the neutral axes of said first path are not turned.

2. A NOLM according to claim 1, wherein said optical demultiplexer and multiplexer are polarization-maintaining optical couplers that are wavelength-selective to separate and combine said first and second optical signals having said first and second wavelengths.

3. A NOLM according to claim 1, wherein said polarization-maintaining fiber segments are four in number and said splices are three in number.

4. A NOLM according to claim 3, wherein the lengths of said four polarization-maintaining fiber segments are selected so that the non-linear phase shift induced by control on one of the neutral axes and integrated over the i first segments (the first half of the loop T1, T2), is equal to the non-linear phase shift induced by the control on the other axis and integrated over the i last segments (in the second half of the loop, T3, T4).

5. An optical wavelength converter including a NOLM according to claim 1.

6. An optical switch including a NOLM according to claim 1.

7. An optical modulator for a loop fiber laser including a NOLM according to claim 1.

8. An optical soliton regenerator that performs time jitter correction, including a NOLM according to claim 1.

* * * * *